July 3, 1951            E. V. BRYANT            2,558,817
SNOW, ICE, AND FROST SHIELD FOR WINDSHIELDS
Filed May 8, 1946
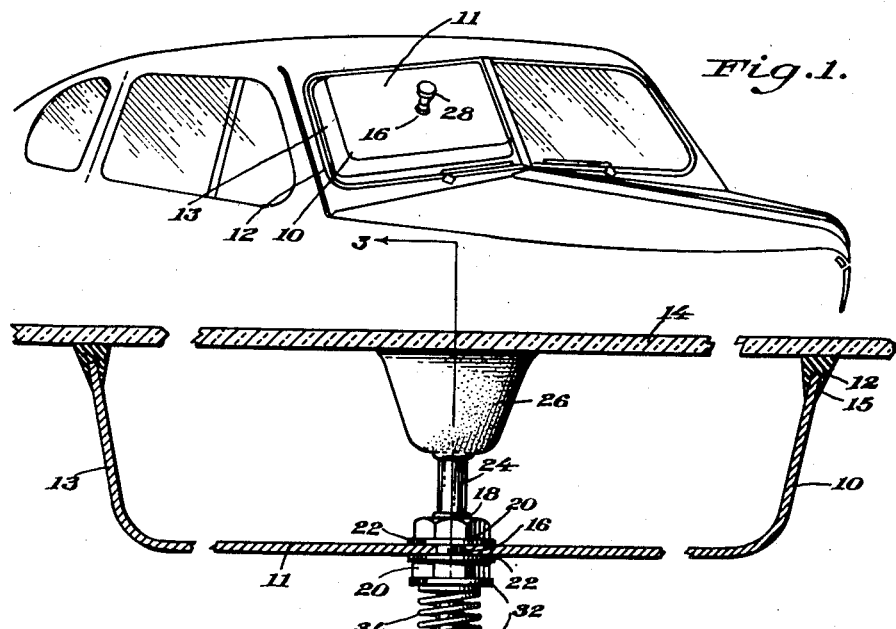
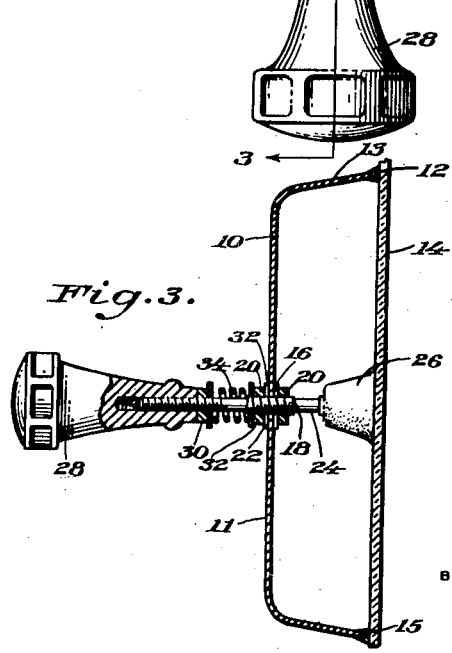
INVENTOR.
Edmond V. Bryant
BY Victor J. Evans & Co.
ATTORNEYS Patented July 3, 1951

2,558,817

UNITED STATES PATENT OFFICE 2,558,817

SNOW, ICE, AND FROST SHIELD FOR WINDSHIELDS

Edmond V. Bryant, Cleveland, Ohio

Application May 8, 1946, Serial No. 668,260

1 Claim. (Cl. 296—84)

This invention relates to a snow, ice, frost and dirt shield for windshields of automobiles, trucks, and buses while parked.

An object of the invention is to provide a device which when installed on the windshield will prevent snow, ice and frost forming thereon when the vehicle is parked. The shield may also be used around blast furnaces, steel mills, chemical plants, etc. where industrial dirt leaves chimneys of plants and settles on cars or to prevent ordinary dirt from accumulating on the windshields.

The device saves time eliminating the necessity of scraping ice from the windshield or the scraping off of dirt collected thereon.

Another object of the invention is to provide a device that is simple in operation, efficient in use and can be inexpensively manufactured.

With the above and other objects and advantages in view the invention consists of the novel details of construction, arrangement and combination of parts more fully hereinafter described, claimed and illustrated in the accompanying drawing in which:

Figure 1 is a perspective view of an embodiment of the invention as applied to the windshield of a motor vehicle.

Figure 2 is a view partly in section looking from above and

Figure 3 is a sectional view on the line 3—3 of Figure 2.

Referring more in detail to the drawing the reference numeral 10 designates the body of the device which is pan shaped having the bottom wall 11 and the upstanding marginal wall 13, which is contoured to fit the windshield of a motor vehicle. In Figure 1 the windshield is shown in two parts, thus requiring the use of two shields but the shield can also be made in one section to fit a one piece windshield or the two shields may be made also to be used on a one piece shield.

The peripheral rim 15 of the walls 13 of the body 10 is provided with a rubber gasket 12 which makes a tight fit between the body 10 and the windshield 14.

At the approximate center of the body 10 an aperture 16 is provided in which the threaded nipple 18 is mounted and nuts 20 mounted on the nipple 18 will when tightened hold the nipple in position in the body 10, washers 22 positioned between the nuts 20 and the body 10 provide a tight seal between the nuts and the body.

Slidably mounted in the nipple 18 is the shaft 24 on one end of which is fastened the vacuum cup 26 and on the other end a knob 28 which is locked on the threaded end of the shaft 24 by a nut 30.

Mounted on the shaft 24 are the washers 32, one of which contacts the nut 30 and the other contacts one of the nuts 20 and a spring 34 mounted on the shaft 24, intermediate the washers 32, forces the vacuum cup 26 out of contact with the windshield when the device is not in use. The spring will also hold the shield against the windshield after the vacuum cup has become attached to the glass. The tension of the spring can also be adjusted by screwing handle down on the spring.

In operation the body is positioned on the windshield as shown in Figure 1 and the knob is pressed inwardly to engage the vacuum cup with the windshield to retain the body thereon, thus protecting the windshield from ice, snow, frost and dirt. The shield can be made to fit the contour of oval or curved glass in rear windows as well as windshields.

It is believed that the operation of the device will be apparent to those skilled in the art and that it is to be understood that changes may be made in the details of construction, arrangement and combination of parts without departing from the spirit of the invention and the scope of the appended claim.

Having thus described the invention, what is claimed as new and desired to be secured by Letters Patent is:

In a snow, ice and frost shield for windshields having a pan shaped opaque body provided with a rubber gasket on the marginal edge thereof, the improvement comprising means for retaining said body in position on the windshield of a motor vehicle and said means including, a threaded nipple mounted in the body centrally thereof, retaining means on the nipple on opposite sides of the body to retain the nipple in the body, a pair of washers on the nipple intermediate of the retaining means and the body, a shaft slidably mounted in said nipple, a vacuum cup on the inner end of the shaft to contact said windshield and a knob on the opposite end of the shaft to force said vacuum cup into contact with said windshield, a second pair of washers on said shaft intermediate of said knob and one of said retaining means, and a spring on said shaft intermediate of said second pair of washers adapted to urge said knob away from said body to move said shaft to draw said vacuum cup within said body after said body has been removed from said windshield.

EDMOND V. BRYANT.

REFERENCES CITED

The following references are of record in the file of this patent:

UNITED STATES PATENTS

| Number | Name | Date |
|---|---|---|
| 983,701 | Gardiner | Feb. 7, 1911 |
| 1,097,295 | Brown et al. | May 19, 1914 |
| 1,894,862 | Grudnicki | Jan. 17, 1933 |
| 1,927,034 | Herron | Sept. 19, 1933 |
| 2,331,600 | Dillow | Oct. 12, 1943 |